United States Patent
Chui et al.

(10) Patent No.: US 6,587,507 B1
(45) Date of Patent: Jul. 1, 2003

(54) SYSTEM AND METHOD FOR ENCODING VIDEO DATA USING COMPUTATIONALLY EFFICIENT ADAPTIVE SPLINE WAVELETS

(75) Inventors: Charles K. Chui, Menlo Park; Lefan Zhong, Santa Clara, both of CA (US)

(73) Assignee: PicSurf, Inc., Mountain View, CA (US)

( * ) Notice: Subject to any disclaimer, the term of this patent is extended or adjusted under 35 U.S.C. 154(b) by 0 days.

(21) Appl. No.: 09/445,100

(22) PCT Filed: Jun. 1, 1998

(86) PCT No.: PCT/US98/11231

§ 371 (c)(1),
(2), (4) Date: Mar. 24, 2000

(87) PCT Pub. No.: WO98/54907

PCT Pub. Date: Dec. 3, 1998

Related U.S. Application Data

(60) Provisional application No. 60/047,371, filed on Jun. 2, 1997.

(51) Int. Cl.[7] .............................. H04N 7/12; H04N 7/30
(52) U.S. Cl. .................................................. 375/240.19
(58) Field of Search ........................... 348/384.1, 390.1, 348/403.1, 404.1; 382/232, 248; 375/240, 240.02, 240.18, 240.19; H04N 7/12, 7/30

(56) References Cited

U.S. PATENT DOCUMENTS

| | | | |
|---|---|---|---|
| 5,262,958 A | | 11/1993 | Chui et al. |
| 5,594,853 A | * | 1/1997 | Salesin et al. .............. 345/441 |
| 5,600,373 A | | 2/1997 | Chui et al. |
| 5,875,108 A | * | 2/1999 | Hoffberg et al. .............. 707/17 |
| 5,987,459 A | * | 11/1999 | Swanson et al. ................ 707/6 |
| 6,272,253 B1 | * | 8/2001 | Bannon et al. .............. 382/236 |

FOREIGN PATENT DOCUMENTS

| | | |
|---|---|---|
| WO | PCT/US98/11231 | 10/1998 |

OTHER PUBLICATIONS

Vetterli, M. et al.; "Perfect Reconstruction FIR Filter Banks: some Properties and Factorizations";, IEEE Transactions on Acoustics, Speech, and Signal Processing; Jul. 1989; vol. 37, No. 7, pp. 1057–1071.

Flickner et al, Fast Least–Squares Curve Fitting Using Quasi–Orthogonal Splines, 1994, IEEE,, pp. 686–690.*

"Matching Pursuits with Time–Frequency Dictionaries"; Stephane G. Mallat and Zhifent Zhang; IEEE Transactions on Signal Processing, vol. 41, No. 12, Dec. 1993; pp. 3397–3415.

"Matching Pursuit for Compression and Application to Motion Compensated Video Coding"; Martin Vetterli and Ton Kalker; Dept. of EECS, UC Berkeley, CA; 0–8186–6950–0/94 1994 IEEE, pp. 725–729.

* cited by examiner

*Primary Examiner*—Nhon Diep
(74) *Attorney, Agent, or Firm*—Pennie & Edmonds LLP

(57) ABSTRACT

A system and method for encoding a two dimensional array of data utilizes a library having entries corresponding to a set of predefined two dimensional adaptive spline wavelet waveforms. Each predefined two dimensional adaptive spline wavelet waveform is formed by the superposition of one or more B-splines. The data encoding method identifies a set of best matches between the array of data and the predefined two dimensional adaptive spline wavelet waveforms by generating the inner product of the array of data and each of the predefined two dimensional adaptive spline wavelet waveforms. Each inner product is generated by FIR filtering the data with a corresponding set of FIR filter coefficients, and then determining which of the inner products have largest values. Once a set of best matches has been found, the data encoding method generates data representing the identified set of best matches. The generated data indicates for each match: one of the library entries, a position within the array of data at which the match was found, and a magnitude of the match. The data encoding method is computationally efficient because inner products are computed by FIR filtering.

12 Claims, 10 Drawing Sheets

Residual (or Delta) Frame divided into 8x8 pixel regions

| a | m | level | adaptive B-spline coefficients |
|---|---|---|---|
| 0 | 1 | 0 | -1, 0, 1 |
| 1 | 1 | 0 | 1, 1 |
| 2 | 4 | 0 | 1 |
| 3 | 4 | 0 | -1, 2, -1 |
| 4 | 4 | 0 | -1, 0, 2, 0, -1 |
| 5 | 4 | 0 | -1, 1, 1, -1 |
| 6 | 4 | 0 | 1, 1, 1, 1, 1 |
| 7 | 4 | 1 | 1 |
| 8 | 4 | 1 | 1, -1 |
| 9 | 4 | 1 | 1, 1, -1, -1 |
| 10 | 4 | 1 | -1, 1, 1, -1 |
| 11 | 4 | 1 | -1, 2, -2, 1 |
| 12 | 4 | 1 | 1, 1, 1, 1, 1 |
| 13 | 4 | 2 | 1 |
FIG. 5
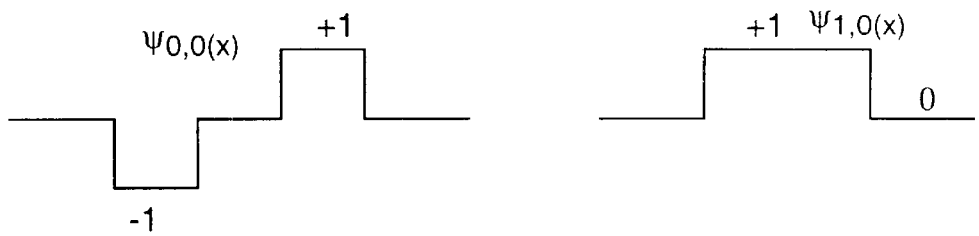
FIG. 6A  FIG. 6B
FIG. 6C  FIG. 6D Vector for Identified Max Match Code x, y as Huffman of x + 8*y ∈ [0,P-1] where P=x+8*y of prior max match in 8x8 sector, if any.

Code Library Entry α,β and YUV flag together:
If YUV=Y, code α,β using standard Huffman coding
elseif YUV=U, output = 1110 followed by standard Huffman coding for α, β;
elseif YUV=V, output = 1111 followed by standard Huffman coding for α, β;

SYSTEM AND METHOD FOR ENCODING VIDEO DATA USING COMPUTATIONALLY EFFICIENT ADAPTIVE SPLINE WAVELETS

The present invention is described in U.S. provisional patent application No. 60/047,371, filed Jun. 2, 1997, "Wavelet-based Adaptive Spline Modeling for Coding Motion-Compensated Residual Frames," which is hereby incorporated by reference in its entirety.

The present invention relates generally to encoding frames of motion compensated, differential video data, and particularly to a method of encoded so-called "residue frames" of MPEG video data by representing only the highest energy portions of the residue frames as the sum of a set of predefined two-dimensional waveforms.

BACKGROUND OF THE INVENTION

Referring to FIG. 1, a preferred embodiment of the present invention operates in the context of a video encoding and decoding systems. In a typical video system 100 a video camera or other video source 113 outputs a series of video frames that are initially processed and encoded by a video encoder 132. The video encoder may be an MPEG, MPEG2, MPEG4 or similar encoder, but could also be any other type of video encoder that generates motion compensated residue or delta frames representing the differences between certain frames and earlier frames. In the preferred embodiment, the output of the video encoder 132 includes so called I frames and "residue frames." In simple terms, each I frame contains "primary data" representing an entire new picture, called a frame, while each residue frame contains differential data representing the differences between a previous video frame and a subsequent video frame.

The I frames and residue frames are compressed using various techniques to produce compressed data 124 (sometimes herein called encoded data). The present invention concerns only a data compressor 134 used to compress "residue frames" and other sparse sets of data that contain "islands" of non-zero values. The resulting encoded data 124 is stored, or transmitted to another computer, or both, using appropriate storage and transmission mechanisms 106, 112.

A video decoder 140 and data decompressor 135 convert the compressed video data 124 back into "reference pictures," which represent reconstruct frames of video data. The reconstructed video data frames are the same frames as those that a video decoder would generate while processing the compressed video data for viewing. The video encoder 132 compares a current video data frame with a motion compensated version of the most recent reference picture to generate a residue frame.

To reconstruct video images from encoded data, a data decompressor 135 is used to reverse the encoding process performed by the data compressor 134. Once again, in this document we are only concerning with the part of the system or process dealing with residue frames or sparse data frames. The resulting decoded data is then processed by a video decoder (e.g., a MPEG or similar decoder) 140, which reconstructs a set of video frames suitable for viewing on a video monitor 115, or for storage in uncompressed form in a data storage device 106.

As can be seen from the above discussion, the data compressor and decompressor of the present invention supplement the operation of motion compensating video encoders and decoders, enabling further compression of the video data. This reduces the bandwidth needed to transmit video images and the storage required to store such video images.

FIG. 3 is a highly schematic representation of a residue frame. The residue frame is filled primarily with data having very small values. A relatively small portion of the data in the residue frame has significant energy. The high energy portions of the residue frame are represented in FIG. 3 by concentric circular and oval regions, each line representing data values of equal energy. The regions of the residue frame between the circular and oval regions represent low energy data values.

One goal of the present invention is to match the shapes of the peaks in the residue frame with predefined two dimensional waveforms so that each such peak can be presented as the sum (i.e., superposition) of a small number of predefined waveforms, each multiplied by a magnitude value to indicate the best scaling of the predefined waveforms to match the data in the residue frame. Generally, the process of finding the best matches between a set of two dimensional data and a set of predefined waveforms requires computing the inner product of the data with each of the predefined waveforms at all possible positions within the data. Computing such inner products is typically computationally intensive because it requires the computation of the integral of each predefined waveform at every possible position of the waveforms within the data.

Another goal of the present invention is provide a set of spatially truncated two dimensional waveforms that have the property that determining the best match between the waveforms and a set of data is can be accomplished very efficiently through the successive application of a set of FIR (finite impulse response) filters. In particular, it is a goal of the present invention to reduce the computations required to find a best match between residue frame data and the predefined waveforms by using waveforms whose inner product with a set of video data can be generated through the application of FIR filters. Furthermore, it is a goal of the present invention to use waveforms that have been defined so that match values for a second waveform can be obtained by applying a predefined FIR filter to the match values for a first one of the waveforms.

SUMMARY OF THE INVENTION

In summary, the present invention is a system and method for encoding a two dimensional array of data. The data to be encoded may be a residue frame generated by a motion compensated video encoder.

The data encoding method utilizes a library having entries corresponding to a set of predefined two dimensional adaptive spline wavelet waveforms. Each predefined two dimensional adaptive spline wavelet waveform is formed by the superposition of one or more B-splines.

The data encoding method identifies a set of best matches between the array of data and the predefined two dimensional adaptive spline wavelet waveforms by generating the inner product of the array of data and each of the predefined two dimensional adaptive spline wavelet waveforms. Each inner product is generated by FIR filtering the data with a corresponding set of FIR filter coefficients, and then determining which of the inner products have largest values. Once a set of best matches has been found, the data encoding method generates data representing the identified set of best matches. The generated data indicates for each match: one of the library entries, a position within the array of data at which the match was found, and a magnitude of the match.

The data encoding method is computationally efficient because inner products are computed by FIR filtering. Further, the inner product between the array of data and some of the predefined two dimensional adaptive spline wavelet waveforms is generated by FIR filtering another one of the inner products using FIR filter coefficients specified by the library.

In addition, the inner product between the array of data and a first one of the predefined two dimensional adaptive spline wavelet waveforms having a low resolution level is generated by FIR filtering an earlier generated inner product of the array of data and a second one of the predefined two dimensional adaptive spline wavelet waveforms having a higher resolution level, using a predefined set of resolution modifying FIR filter coefficients. This feature of the invention takes advantage of the multiresolution properties of B-splines and enables the use of short FIR filters to efficiently compute the inner product between an array of data an low resolution waveforms.

BRIEF DESCRIPTION OF THE DRAWINGS

Additional objects and features of the invention will be more readily apparent from the following detailed description and appended claims when taken in conjunction with the drawings, in which:

FIG. 5 is a table representing a library or predefined set of one dimensional waveforms, called adaptive spline wavelets, which are combined to form the two dimensional waveforms that are matched to residue frame data by a data compression procedure.

DESCRIPTION OF THE PREFERRED EMBODIMENTS

Figure 2:
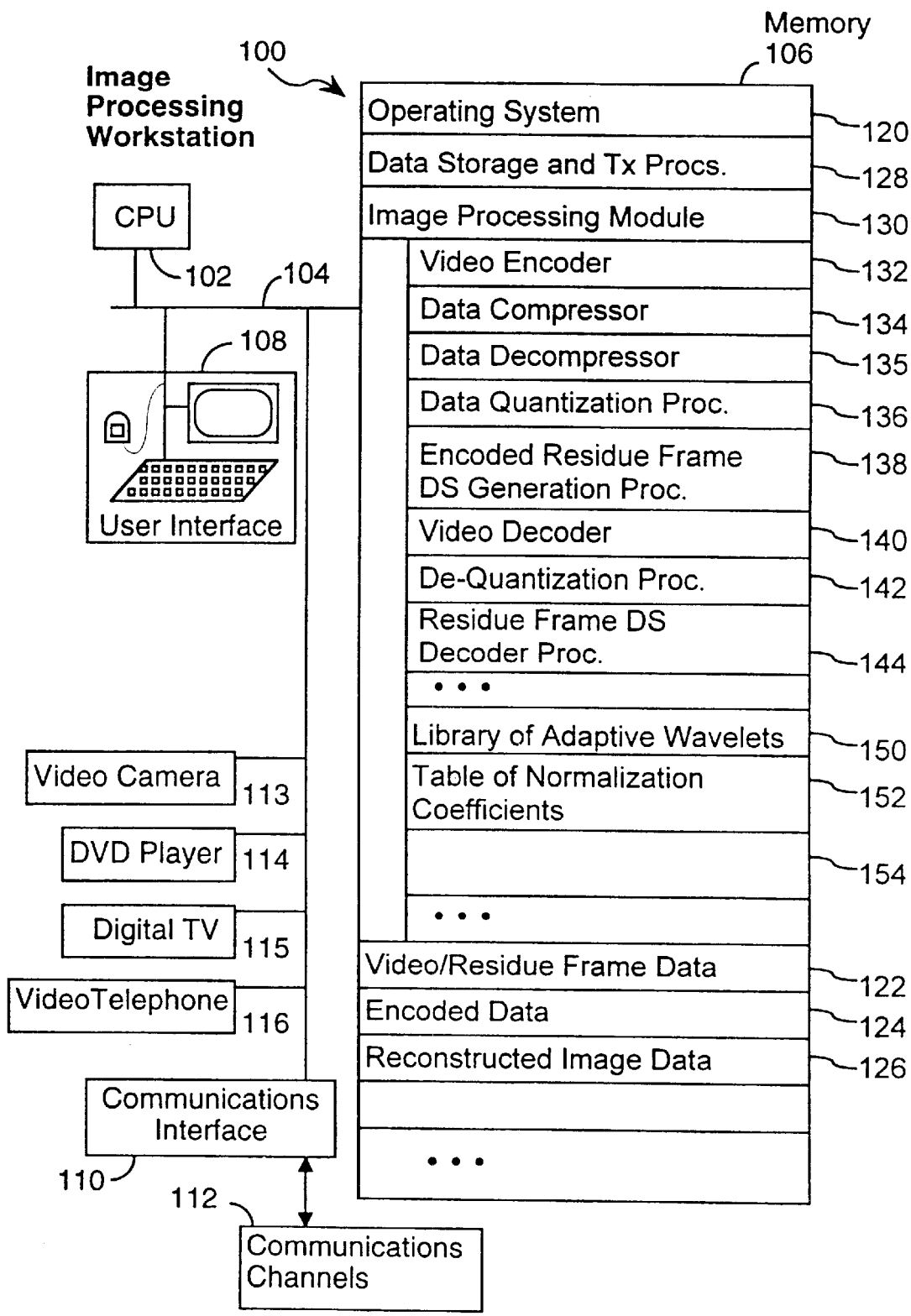
FIG. 2 is a block diagram of a computer system that implements a video data processing system.

Referring to FIG. 2, there is shown a computer system 100 that implements a video data processing system. In a preferred embodiment, the computer system 100 includes:

- a central processing unit 102 (also called a data processing unit);
- an internal memory bus 104;
- memory 106, which may include both high speed random access memory and slower non-volatile memory (e.g., magnetic disk storage);
- a user interface 108, typically including a keyboard, pointer device, and monitor;
- a communications interface 110 for sending and receiving files and other data to other computers via various communications channels 112.

Optionally, the computer system 100, depending on the type of product in which the system 100 is being used, may optionally further include a video camera 113, a DVD player 114, a digital television 115, and/or a video telephone 116. These additional devices are video data input and output devices that can be used in conjunction with the video processing functions of the system.

The memory 106 may store:

- an operating system 120 for controlling the background functions of the system 110;
- video data, including residue frame data 122;
- encoded video data 124, which is generally compressed and therefore occupies less space than the corresponding video residue frame data 122;
- reconstructed video data 126, which is video data that has been reconstructed from encoded video data 124;
- data storage and transmission procedures 128, which may be part of the operating system; and
- an image processing module 130, which handles the processing of video data.

The image processing module 130 may include an video encoder 132, which is a module containing procedures that convert a sequence of video frames into a sequence of data frames that includes the previously mentioned I and residue frames. A corresponding video decoder 140 module procedures for decoding a sequence of I and residue frames so as to reconstruct a corresponding set sequence of video frames. In other embodiments, the video encoder 132 and decoder 140 may be implemented as a separate circuit, or as a circuit within the CPU, or may be partially implemented in hardware and partially in software. Since the present invention does not change the underlying operation of the video encoder 130 and decoder 140 (sometimes collectively called a "codec"), the present invention is believed to be compatible with most implementations of such video codec.

The image processing module 130 may further include:

- an data compressor procedure 134 that identifies the best matches between the predefined two dimensional waveforms and a residue frame and encodes those matches;
- a data decompressor procedure 135 that reconstructs video images from compressed video data;
- a data quantization procedure 136 (also called a quantizer) that quantizes waveform match coefficients to enable efficient encoding of those values;
- a procedure 138 for packing the waveform match data into a space efficient data structure;
- a decoder procedure 140, which reconstructs a Residue frame from the encoded data generated by an encoder procedure;
- a data de-quantization procedure 142 (also called a de-quantizer) that maps quantized values back to the corresponding match coefficient values;
- a procedure 144 for unpacking data from the data structure used to stored waveform match data;
- a library 150 of adaptive spline wavelets, which are used to define the two dimensional waveforms that are matched with the Residue frame data; and
- a table 152 of normalization coefficients, which are needed to identify the best matches between the predefined two dimensional waveforms and the residue frame data.

When used in a video capture and storage system or mode, the data decompressor procedure 135 generated reference pictures to the video encoder procedure 132, which uses the reference pictures to generate residue frames. When used in a video playback system or mode, the data decompressor procedure 135 generates video frame data suitable for decoding by a video decoder into a video signal suitable for use reference pictures to the video encoder procedure 132, The general idea of representing an arbitrary set of data using a set of best matches with a predefined set of waveforms is well known. For instance, a standard Fourier transform is a way of representing a set of data as a sum of predefined sinusoidal waveforms. Thus, a two dimensional Fourier transform could be used to represent the data in a residue frame. However, representing residue frame data using a set of sinusoidal waveforms is very computationally intensive, and may not be suitable for low power devices such as video telephones, desktop computers and the like.

B-Splines and Adaptive Spline Wavelets

FIGS. 4A through 4D represent first through fourth order cardinal B-spline functions, respectively. The first order cardinal B-spline $N_1(x)$ is simply a square wave, defined as:

$$N_1(x) = \begin{cases} 1 & \text{if } 0 \leq x < 1 \\ 0 & \text{otherwise} \end{cases} \quad (1)$$

Higher order cardinal B-spline functions $N_m(x)$, for m>1, are defined recursively as:

$$N_m(x) = \int_0^1 N_{m-1}(x-t)\,dt \quad (2)$$

The cardinal B-splines are shifted to the left to give "centered" B-splines as follows:

$$B_m(x) = N_m\left(x + \left\lfloor \frac{m}{2} \right\rfloor\right) \quad (3)$$

where the notation $\lfloor y \rfloor$ indicates the largest integer not exceeding y.

From the centered B-splines, a set of normalized, centered B-splines are formed as follows:

$$\phi^n_{m,j}(x) = \frac{2^{n/2}}{N_{2m}(m)^{1/2}} B_m(2^n x - j) \quad (4)$$

where $N_{2m}(m)$ is a cardinal spline of order 2m, n indicates the resolution level of the normalized B-spline, and j indicates the position at which the normalized B-spline is centered. The values of $N_{2m}(m)$ are give in Table 1. Note that r is equal to 0 in the denominator of the above equation for $\phi^n_{m,j}(x)$.

TABLE 1

| | Values of $N_{2m}(m \pm r)$ | | | | |
|---|---|---|---|---|---|
| m/r | 0 | 1 | 2 | 3 | 4 |
| 1 | 1 | 0 | 0 | 0 | 0 |
| 2 | 4/3! | 1/3! | 0 | 0 | 0 |

TABLE 1-continued

| | Values of $N_{2m}(m \pm r)$ | | | | |
|---|---|---|---|---|---|
| m/r | 0 | 1 | 2 | 3 | 4 |
| 3 | 66/5! | 26/5! | 1/5! | 0 | 0 |
| 4 | 2416/7! | 1191/7! | 120/7! | 1/7! | 0 |

Figure 6E:
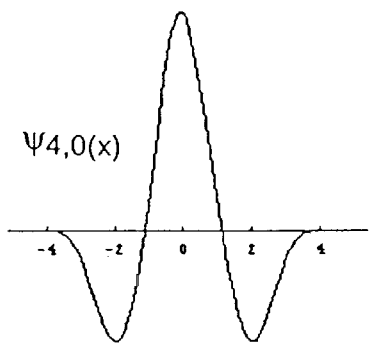
FIGS. 6A–6N depicts the waveforms of the adaptive spline wavelets listed in the table in FIG. 5.
Figure 6F:
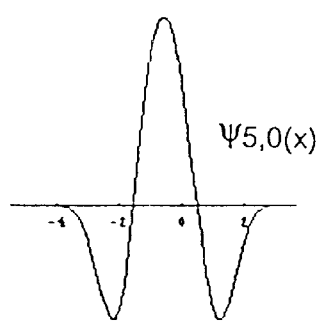
Figure 6G:
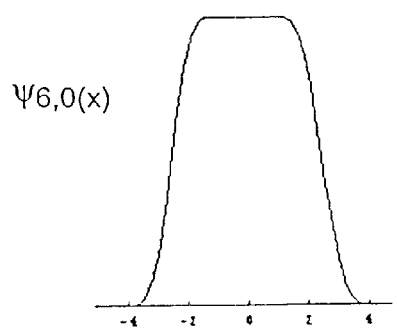
Figure 6H:
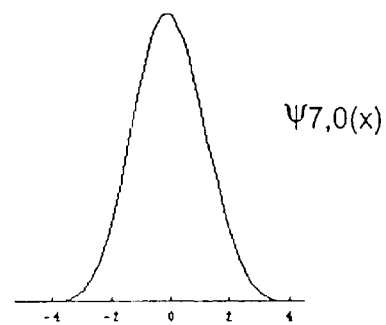
Figure 6I:
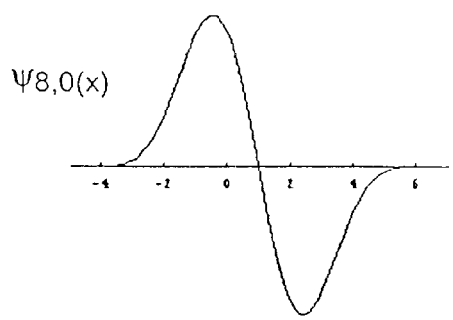
Figure 6J:
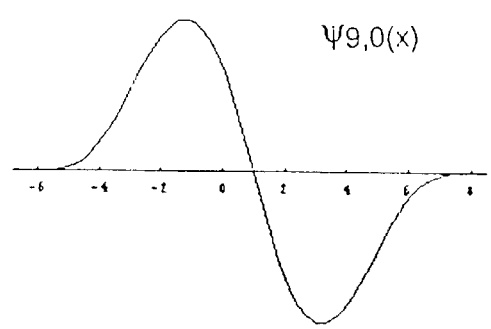
Figure 6K:
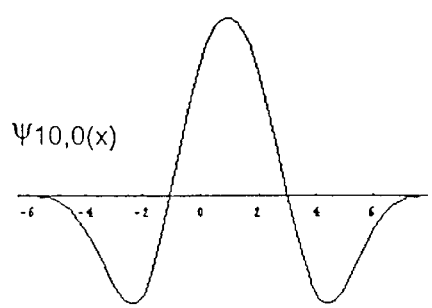
Figure 6L:
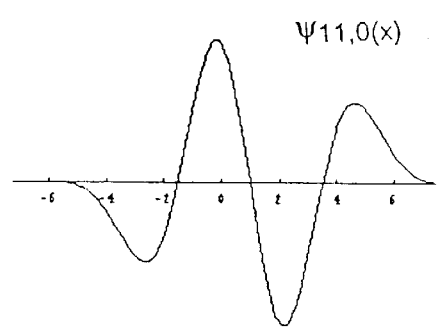
Figure 6M:
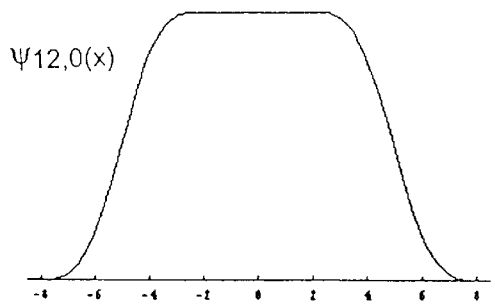

The predefined two dimensional waveforms used in the preferred embodiment of the present invention are formed using linear combinations of the first order B spline and the fourth order B spline functions, as will be explained next with respect to FIGS. 5 and 6A through 6N. The predefined waveforms used by the present invention are herein called "adaptive spline wavelets." One dimensional adaptive spline wavelets will be described first, and then the two dimensional waveforms will be described.

Each of the normalized B-splines is a lowpass filter. From the normalized B-splines, $\phi^n_{m,j}(x)$, a set of "adaptive spline wavelets" are generated as follows:

$$\psi^n_{m,j}(x) = C_a \sum_{ll} a_{j-ll} \phi^n_{m,ll}(x) \quad (5)$$

where the set of coefficients $\{a_i\}$ indicates the combination (i.e., superposition) of normalized B-splines used to form a particular adaptive spline wavelet and $C_a$ is a normalization coefficient that scales the adaptive spline wavelet so as to give it unit energy. In particular, $C_a$ is defined as:

$$C_a = \left\{ \frac{N_{2m}(m)}{\sum_{i,j} a_i a_j N_{2m}(m+i-j)} \right\}^{1/2} \quad (6)$$

The set of two dimensional adaptive spline wavelets used in the present invention are defined as linear combinations of the first order and fourth order normalized B-splines, as follows:

$$\psi^n_{m,j,k}(x,y) = C_g \sum_{l_1,l_2} a_{j-l_1} b_{k-l_2} \phi^{n_1}_{m_1,l_1}(x) \phi^{n_2}_{m_2,l_2}(y) \quad (7)$$

where $m=(m_1, m_2)$, $n=(n_1,n_2)$ and the energy normalization coefficient $C_g$ is computed as follows:

$$C_g = \left\{ \frac{N_{2m_1}(m_1) N_{2m_2}(m_2)}{\sum_{i,j} a_i a_j N_{2m_1}(m_1+i-j)} \times \frac{1}{\sum_{k,l} b_k b_l N_{2m_2}(m_2+k-l)} \right\}^{1/2} \quad (8)$$

As indicated below, in a preferred embodiment a library containing 196 predefined two dimensional adaptive spline wavelets is used, and the $C_g$ for each of those 196 adaptive spline wavelets is pre-computed and stored in the library.

To rewrite equation 7 so as to express $\psi_{m,j,k}^n(x,y)$ in terms of centered B-splines $B_{m_1,l_1}^{n_1}(x)\ B_{m_2,l_2}^{n_2}(y)$ instead of normalized centered B-splines $\phi_{m_1,l_1}^{n_1}(x)\phi_{m_2,l_2}^{n_2}(y)$, the normalization constant $C_g$ in equation 7 is changed to $C_g^*$ as follows:

$$C_g^* = \left\{ \frac{2^{n_1+n_2}}{\sum_{i,j} a_i a_j N_{2m_1}(m_1+i-j)} \times \frac{1}{\sum_{k,l} b_k b_l N_{2m_2}(m_2+k-l)} \right\}^{1/2} \quad (8)$$

to get:

$$\psi_{m,j,k}^n(x,y) = C_g^* \sum_{l_1,l_2} a_{j-l_1} b_{k-l_2} B_{m_1,l_1}^{n_1}(x) B_{m_2,l_2}^{n_2}(y) \quad (9)$$

Library of Adaptive Spline Wavelets

FIG. 5 represents a "library" 150 of fourteen one dimensional adaptive spline wavelets. For convenience, the normalization constants $C_g$ are not given in the expressions of the adaptive spline wavelets in this document.

Each of the first two adaptive spline wavelets is formed by superpositioning (additively combining) copies of the first order B spline $B_1(x)$. The coefficients shown in FIG. 5 for the first adaptive spline wavelet $\psi_0(x)$ represent the multiplier applied to each copy of the B spline. In particular:

$$\psi_0(x) = -B_1(x+1) + B_1(x-1).$$

FIG. 6A shows the one dimensional waveform for $\psi_0(x)$. Similarly, the coefficients shown in FIG. 5 for the second adaptive spline wavelet $\psi_1(x)$ are applied to define that waveform as follows:

$$\psi_1(x) = B_1(x) + B_1(x-1).$$

FIG. 6B shows the one dimensional waveform for $\psi_1(x)$.

The next four adaptive spline wavelets in the library 150 are formed from linear combinations of the fourth order B spline, as follows:

$$\psi_2(x) = B_4(x)$$

$$\psi_3(x) = (-1, 2, -1)B_4(x)$$
$$= -B_4(x+1) + 2B_4(x) - B_4(x-1)$$

$$\psi_4(x) = (-1, 0, 2, 0, -1)B_4(x)$$
$$= -B_4(x+2) + 2B_4(x) - B_4(x-2)$$

$$\psi_5(x) = (-1, 1, 1, -1)B_4(x)$$
$$= -B_4(x+2) + B_4(x+1) + B_4(x) - B_4(x-1)$$

$$\psi_6(x) = (1, 1, 1, 1, 1)B_4(x)$$
$$= B_4(x+2) + B_4(x+1) + B_4(x) + B_4(x-1) + B_4(x-2)$$

FIGS. 6C–6G show the one dimensional waveforms for $\psi_2(x)$ through $\psi_6(x)$.

The next set of adaptive spline wavelets in the library 150 are formed from linear combinations of a version of the fourth order B spline that is scaled to be twice as wide as the basic fourth order B spline. In other words, the scaled B spline has half the resolution of the fourth order B spline. This next set of adaptive spline wavelets are defined as follows:

$$\psi_7(x) = B_4(x/2)$$

$$\psi_8(x) = (1, -1)B_4(x/2)$$

$$= B_4(x/2) - B_4(x/2 - 1)$$

$$\psi_9(x) = (1, 1, -1, -1)B_4(x/2)$$

$$= B_4(x/2 + 1) + B_4(x/2) - B_4(x/2 - 1) - B_4(x/2 - 2)$$

$$\psi_{10}(x) = (-1, 1, 1, -1)B_4(x/2)$$

$$= -B_4(x/2 + 1) + B_4(x/2) + B_4(x/2 - 1) - B_4(x/2 - 2)$$

$$\psi_{11}(x) = (-1, 2, -2, 1)B_4(x/2)$$

$$= -B_4(x/2 + 1) + 2B_4(x/2) - 2B_4(x/2 - 1) + B_4(x/2 - 2)$$

$$\psi_{12}(x) = (1, 1, 1, 1, 1)B_4(x/2)$$

$$= B_4(x/2 + 2) + B_4(x/2 + 1) + B_4(x/2) + B_4(x/2 - 1) + B_4(x/2 - 2)$$

FIGS. 6H–6M show the one dimensional waveforms for $\psi_7(x)$ through $\psi_{12}(x)$.

The last adaptive spline wavelet in the library 150 is formed by scaling the fourth order B spline to have one fourth the resolution of the fourth order B spline. This adaptive spline wavelet is defined as follows:

$$\psi_{13}(x) = B_4(x/4)$$

Figure 6N:
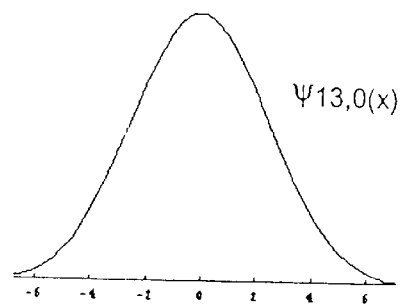

FIG. 6N shows the one dimensional waveform for $\psi_{13}(x)$.

The predefined two dimensional waveforms used by the present invention to represent residue frame data are generated by forming all possible pairwise combinations of the one dimensional wavelets in the library:

$$\psi a, b = \psi_{a1}(x - b1))\psi_{a2}(y - b2)$$

where "a" is a vector of two values (a1, a2) representing a pair of one dimensional adaptive spline wavelets that have been combined to form a two dimensional adaptive spline wavelet, and "b" is a vector (b1, b2) representing the center point of the two dimensional adaptive spline wavelet. The first waveform in each combination controls the value of the ψa,b waveform as a function of position along the x axis, and the second waveform in each combination controls the value of the ψa,b waveform as a function of position along the y axis.

This set of two dimensional adaptive spline wavelets ψa,b is herein called the "library of two dimensional adaptive spline wavelets," or alternately a "predefined set of two dimensional adaptive spline wavelets" or a "predefined set of two dimensional waveforms."

Basic Procedure for Finding Best Fit Between a Set of Data and a Two Dimensional Adaptive Spline Wavelet Given any two dimensional waveform that is defined as the product of two orthogonal one dimensional waveforms, the way to determine the best fit between that waveform and an array of data is to convolve the data with the waveform. Convolving the waveform with the data is performed by simply FIR filtering the data with a set of coefficients representing each of the two one dimensional waveforms.

The location of the largest resulting value represents the location in the data array of the best fit, and the value of the largest resulting value represents the amount by which the two dimensional waveform should be multiplied to best fit the data array.

Figure 7:
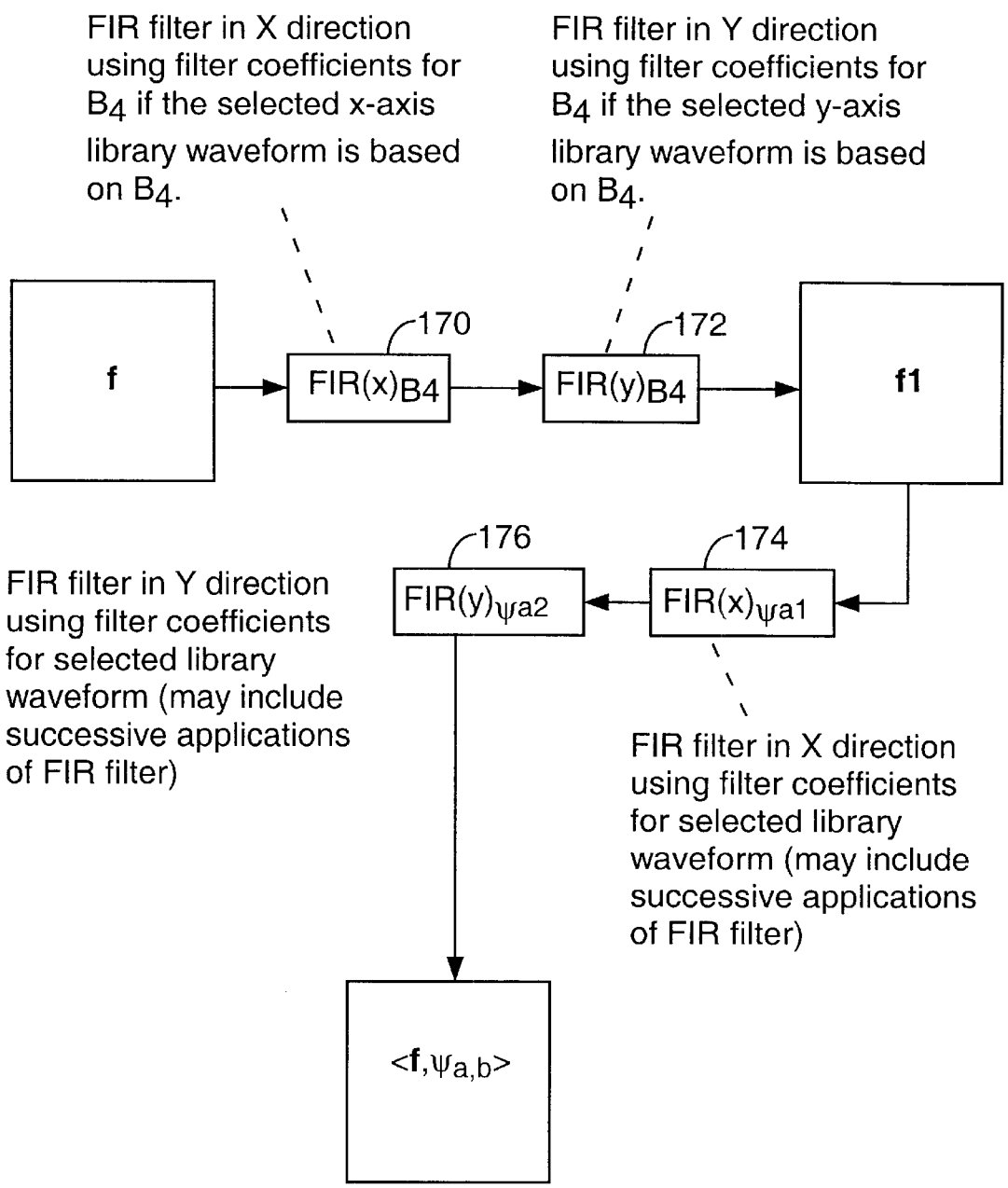
FIG. 7 depicts, in schematic form, the procedure for computing the inner product of a set of video data with a predefined two dimensional waveform by applying a corresponding set of FIR filters to the video data.

Referring to FIG. 7, the procedure for filtering a set of video data to compute match values between a predefined two dimensional waveform and a set of video data f is as follows.

The library of two dimensional adaptive spline wavelets is selected to make the process of forming the inner product of residue frame data with each of the 196 two dimensional adaptive spline wavelets in a library computationally efficient. Forming the inner product of a set of data and a two dimensional waveform is sometimes called convolving the data with data with the waveform.

Because the present invention uses B-spline based waveforms, the inner product of video data and the waveforms can all be computed using FIR filtering, which is well known to be computationally efficient.

To generate the inner product of a residue frame with a two dimensional adaptive spline wavelet defined as:

$$\psi a,0 = \psi_0(x)\psi_1(y)$$

the residue frame data is filtered in the x direction with an FIR filter whose coefficients are (−1, 0, 1), and is also filtered in the y direction with an FIR filter whose coefficients are (1, 1). In other words, the coefficients shown in the table in FIG. 5 represent the FIR coefficients for generating the inner product of the corresponding adaptive spline wavelets with a set of data.

The convolving process, for finding a best match between an adaptive spline wavelet and a set of data, requires an additional FIR filtering step when applying the adaptive spline wavelets formed from fourth order B splines. In particular, the data is first FIR filtered with coefficients (1/6, 4/6, 1/6) representing the fourth order B spline $B_4(x)$ and then is FIR filtered with the library coefficients for the particular adaptive spline wavelet. Thus, as shown in FIG. 7, preliminary FIR filtering steps 170, 172 are performed, to convolve the data with the fourth order B spline if only if the x and y components of the adaptive spline wavelet are based on the fourth order B spline. The resulting, intermediate convolved data f1 is then FIR filtered 174, 176 along the x and y axes using the coefficients for the x and y components of the adaptive spline wavelet. This produces a set of match values <f,ψa,b>, where a represents the two dimensional adaptive spline wavelet with which the data f has been convolved, b represents the positions at which the inner product of f and the adaptive spline wavelet have been evaluated, and the brackets < . . . > represent the inner product or convolution operation. The largest value in this set represents the best match between the data and the two dimensional adaptive spline wavelet.

Multi-Resolution Analysis

Figure 3:
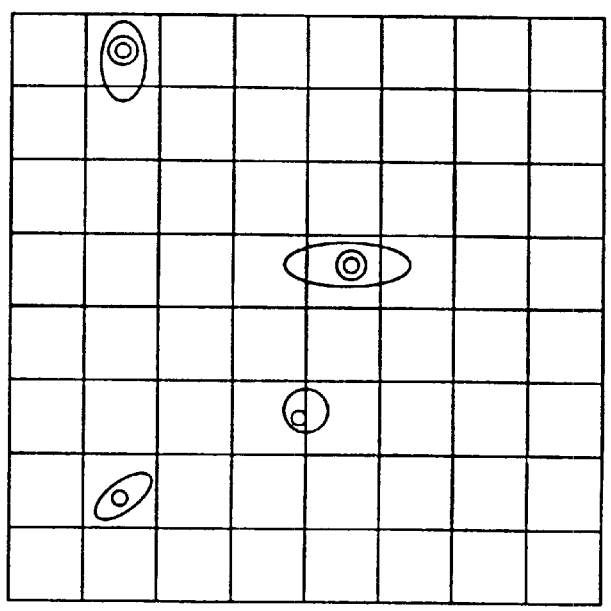
FIG. 3 is a schematic representation of a residue frame.
Figure 4A:
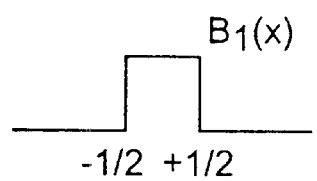
FIGS. 4A through 4D represent first through fourth order B-spline functions, respectively.
Figure 4B:
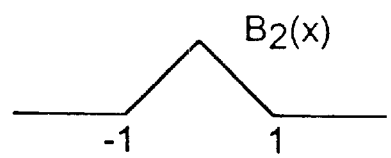
Figure 4C:
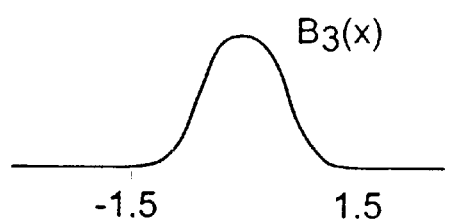
Figure 4D:
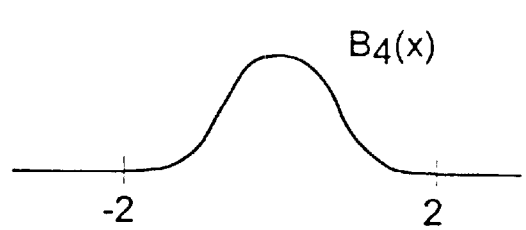

Referring to FIG. 3, the best representation of any high energy region of a Residue frame is often equal to the sum of one or two low resolution waveforms plus one or more higher resolution waveforms. The low resolution waveforms are wider and can be used to roughly model a large, wide peak in the data. The higher resolution waveforms are narrower and can be used to model more localized features of the data. Thus, a region of a residue frame might be represented as:

$$f = c_0\psi LR1, b0 + c_1\psi HR1, b1 + c_2\psi HR1, b2 + \ldots$$

where f represents the model of a peak in the data, $c_0, c_1, c_2$ are real number coefficients, $\psi LR1,b0$ represents a low resolution two dimensional adaptive spline wavelet centered at position b0, $c_1\psi HR1,b1$ represents a high resolution two dimensional adaptive spline wavelet centered at position b1 and $c_2\psi HR1,b2$ represents a high resolution two dimensional adaptive spline wavelet centered at position b2.

Referring to FIG. 5, the "level" value in the adaptive spline wavelet table represents the resolution level of the adaptive spline wavelet. Adaptive spline wavelets at level 0 have the highest spatial resolution; those at level 1 have half of the highest level of spatial resolution, and those at level 2 have one fourth of the highest level of spatial resolution.

A key feature of the present invention is that the only inner products between waveforms and data that need to be computed to generate waveform match values are the inner products of the data with the B-spline functions: $<f(x),B(x-j)>$. All other match values $<f(x),\psi_k(x-j)>$, for all k (i.e., for all waveforms defined in the library) are derived by using very short FIR filters to filter the match values produced by forming the inner product of the data with one of the B-spline functions.

For example, to compute inner product $<f(x),\psi_7(x-j)>$, the previously computed $<f(x),B_4(x-j)>$ match values are first FIR filtered with the filter coefficients ⅛(1, 4, 6, 4, 1), and then the resulting match values are multiplied by a normalization constant. This filtering step, in which a previously computed set of match values are filtered with the filter coefficients ⅛(1, 4, 6, 4, 1), is used to change the resolution level from the highest resolution to a next lower resolution level.

To compute $<f(x),\psi_{12}(x-j)>$, the FIR filter (1,1,1,1,1) is applied to the previously computed inner product $<f(x),\psi_7(x-j)>$. Note, however, that since x/2 (rather than x) is the variable for $\psi_{12}$, the FIR filtering produces:

$$\langle f, \psi_{12}\rangle = C_a \left\{ \begin{array}{l} \langle f, \psi_7(x+4)\rangle + \langle f, \psi_7(x+2)\rangle + \\ \langle f, \psi_7(x)\rangle + \langle f, \psi_7(x-2)\rangle + \langle f, \psi_7(x-4)\rangle \end{array} \right\} \quad (10)$$

Note that although the FIR filter (1,1,1,1,1) is used, it is only applied to every second term in the convolution. In other words, the filter is applied to values at odd positions to generate a first value, then applied to values at a next set of even positions to generate a second value, and so on. Thus, from another viewpoint the FIR filter for $\psi_{12}$ is really (1,0,1,0,1,0,1,0,1). The reason for this is that $\psi_7(x)$ is a constant multiple of $B_4(x/2)$, and x/2 is used as the variable in the convolution.

The computation of the normalization constants $C_a$ is also simple. For example, for a=(1,1,1,1,1), as above, $$C_a = \left\{ \frac{N_8(4)}{\sum_j a_j N_8(4-j)} \right\}^{1/2} \quad (11)$$

$$= \left\{ \frac{2416}{120 + 1191 + 2416 + 1191 + 120} \right\}^{1/2}$$

As indicated above, the inner product of the video data with a lower resolution adaptive spline wavelets can be computed by simply FIR filtering the match data produced by forming the inner product of the video data with a corresponding higher resolution adaptive spline wavelet:

$$<f,\psi_{ResLevelZ}> = FIR_{MRA}(<f,\psi_{ResLevelZ-1}>)$$

where $FIR_{MRA}$ is an FIR filter having coefficients of ⅛(1, 4,6,4,1).

This property is important because it means that the amount of computation required to compute the convolutions of the data with a lower resolution adaptive spline wavelet is about the same as for computing the convolution with a higher resolution adaptive spline wavelet. Normally, the computation required to compute the convolutions of the data with a lower resolution waveform would be much higher (two to four times as high) as for a higher resolution waveform because the wider shape of the lower resolution waveform would require more multiplications of data values with filter coefficients.

Figure 8:
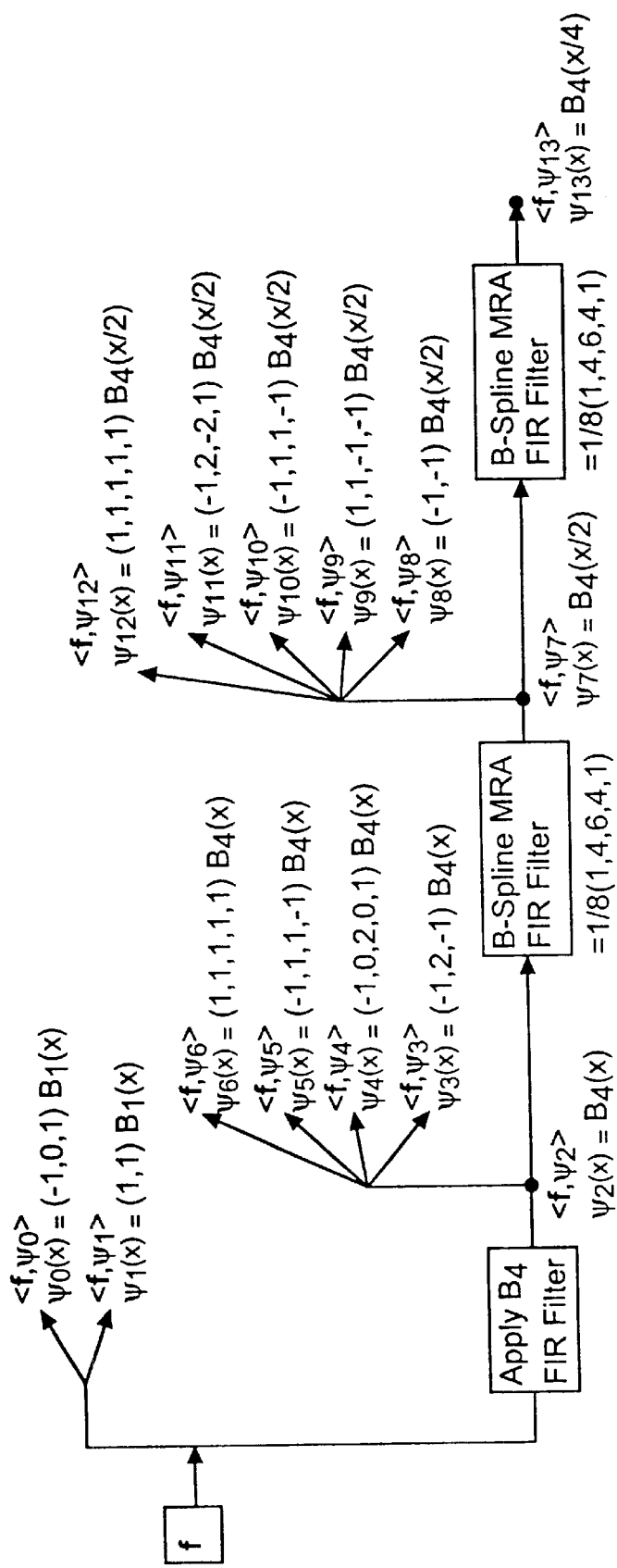
FIG. 8 schematically depicts computational relationships between the inner products of a set of residue frame data f with each of a set of predefined waveforms $\psi_i$.

FIG. 8 depicts the computational steps needed to convolve a set of data with each of the fourteen adaptive spline wavelets in the library. To make a realistic example, suppose that we are going to convolve a two dimensional set of data with a set of fourteen waveforms: all use the same adaptive spline wavelet for the y axis, which is combined with each of the fourteen adaptive spline wavelets for application to the x axis. To perform these fourteen two dimensional convolution computations, the following computations would be performed:

1) convolve data in y direction with y waveform to form f1;
2) convolve f1 with $\psi_0(x)$ by FIR filtering f1 along the x axis with coefficients of (−1, 0, 1);
3) convolve f1 with $\psi_1(x)$ by FIR filtering f1 along the x axis with coefficients of (1,1);
4) convolve f1 with the fourth order B spine $B_4(x)$ to produce $<f1,\psi_2(x)>$, which we will call f2; save the f2 array for future use;
5) convolve f2 with $\psi_3(x)$ by FIR filtering f2 along the x axis with coefficients for $\psi_3$ (shown in FIG. 5 to be (−1,2,−1));
6) convolve f2 with $\psi_4(x)$ by FIR filtering f2 along the x axis with the FIR coefficients for $\psi_4$.
7) convolve f2 with $\psi_5(x)$ by FIR filtering f2 along the x axis with the FIR coefficients for $\psi_5$.
8) convolve f2 with $\psi_6(x)$ by FIR filtering f2 along the x axis with the FIR coefficients for $\psi_6$.
9) convolve f2 with the multi-resolution analysis FIR filter so as to reduce its resolution by a factor of 2, thereby producing an array herein called f3, which is also saved for future use;
10) convolve f3 with $\psi_8(x)$ by FIR filtering f3 along the x axis with the FIR coefficients for $\psi_8$;
11) convolve f3 with $\psi_9(x)$ by FIR filtering f3 along the x axis with the FIR coefficients for $\psi_9$;
12) convolve f3 with $\psi_{10}(x)$ by FIR filtering f3 along the x axis with the FIR coefficients for $\psi_{10}$;
13) convolve f3 with $\psi_{11}(x)$ by FIR filtering f3 along the x axis with the FIR coefficients for $\psi_{11}$;
14) convolve f3 with $\psi_{12}(x)$ by FIR filtering f3 along the x axis with the FIR coefficients for $\psi_{12}$;
15) convolve f3 with the multi-resolution analysis FIR filter so as to reduce its resolution by a factor of 2, thereby producing an array herein called f4.

In each of steps 2 through 14, above, the procedure identifies the position and value of the maximum value in the convolved data. The best fit of the fourteen two dimensional adaptive spline wavelets with the input data f is determined by determining which of the two dimensional adaptive spline wavelets produced the largest match value.

Procedure for Encoding One Residue Frame

Figure 9:
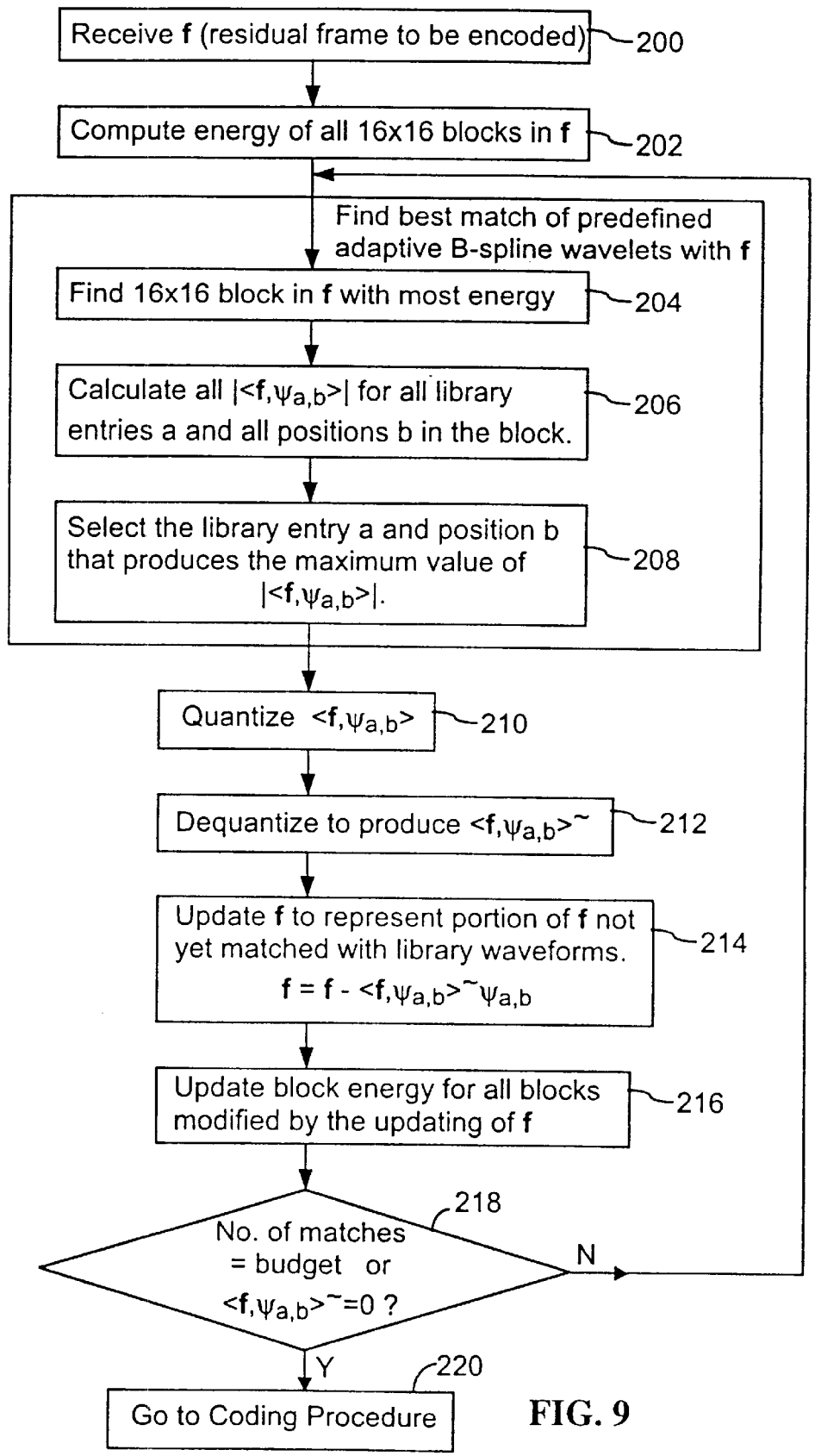
FIG. 9 is a flow chart of the procedure for encoding a residue frame by repeatedly finding the best match between the residue frame data and a set of predefined two dimensional waveforms, and sending the resulting match determinations to an encoding procedure for encoding.

FIG. 9 is a flow chart of the encoder procedure 134 for encoding a Residue frame. The procedure begins by receiving the array of data f to be encoded (step 200), dividing the data array into 16×16 subarrays and computing the energy of each one of the 16×16 blocks (202). These block energy values are stored and later revised during operation of the encoder procedure.

Next, the procedure finds the best match between the residue frame data and a set of predefined two dimensional waveforms (steps 204–208). In particular, the procedure selects the 16×16 block in f having the most energy (step 204), and then calculates the convolution of that 16×16 block with all 196 of the predefined two dimensional adaptive spline wavelets in the library (step 206) to produce a set of values represented as $|<f,\psi_{a,b}>|$, where a identifies the two dimensional adaptive spline wavelet convolved with the data, and b identifies the position within the data corresponding to a particular match value.

The position and value of the largest match value generated using each adaptive spline wavelet is recorded, representing the best match of that adaptive spline wavelet with the 16×16 block of data. The adaptive spline wavelet with the maximum match value, after taking into account the normalization coefficient $C_g$ for each adaptive spline wavelet, identifies the adaptive spline wavelet that best matches the data in the selected 16×16 block (step 208), and the position b of the largest value generated when convolving that adaptive spline wavelet with the 16×16 block identifies the position of the best fit of that adaptive spline wavelet to the 16×16 block of data.

Next, the match value for the best match identified in step 208 is quantized (step 210). Match values are quantized to enable efficient encoding of those values. For instance, match values might be quantized by multiplying the match value by a quantization scaling factor and then generating the largest integer not exceeding that value.

The quantization process is then reversed by dividing the quantized value by the quantization scaling factor (step 212) to generate a dequantized match value $<f,\psi_{a,b}>^-$.

Next, the data f being encoded is updated by subtracting from that data the best match adaptive spline wavelet multiplied by the dequantized match value:

$$f=f-<f,\psi_{a,b}>^-\psi_{a,b}$$

(step 214). In addition, the block energy for all blocks modified by the updating of f are updated or recomputed. More than one 16×16 block may be affected if the selected adaptive spline wavelet is positioned near the boundary of a block.

Finally, a determination is made as to whether or not (A) the number of matches made so far has reached a maximum (budget) value, or (B) the dequantized match value is equal to zero (step 218). If either of these conditions is true (218-Y) the encoder procedure calls a data packing procedure for storing the adaptive spline wavelet matches in a predefined data structure (step 220). Otherwise, the procedure resumes at step 204 to find the next best match of an adaptive spline wavelet with the updated data f.

Encoding the Best Waveform Matches

Figure 10:
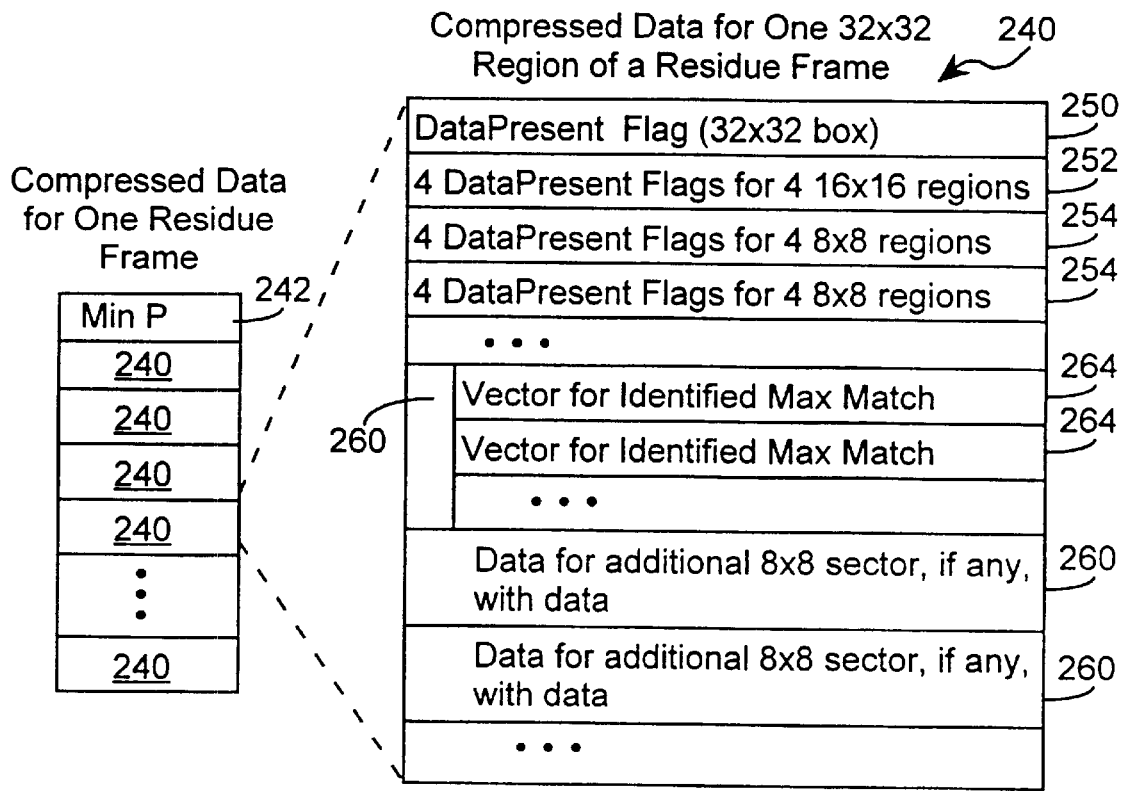
FIGS. 10 and 11 represents the data structure used to represent a residue frame as a set of matches with predefined two dimensional waveforms.

Referring to FIG. 10, the compressed data representing a residue frame of video data is stored as a sequence of blocks 240, each representing the set of waveform matches found in each 32×32 region of the residue. The blocks 240 are ordered in accordance with a raster scan ordering of the 32×32 regions in the residue frame. The compressed data also includes a value 242 representing the smallest quantized magnitude match of all the waveform matches found for the residue frame. This "minimum P" value is encoded using a predefined number of bits, such as eight.

Each block 240, representing the data in a 32×32 region, begins with a flag 250 that indicates whether or not there is any data for this region. If not, the block 240 contains just the one flag value. Otherwise, the flag 250 is followed by a set of four data present flags 252 indicating if there is any data for each of the 16×16 subregions of the 32×32 region. For each 16×16 subregion whose flag indicates the presence of data, the data structure 240 includes a set of four data present flags 254 indicating whether there is any data for each of the 8×8 subregions of the 16×16 region. Thus, the number of sets of data present flags 254 is equal to the number of flags 252 having a value of True. The above described flags 250, 252, 254 provide "position code splitting" of the 32×32 region into 8×8 subregions.

Next, the data structure 250 contains one or more subblocks 260, each of which represents the waveform matches found in a 8×8 subregion of the 32×32 region. The subblocks 260 are ordered in accordance with the 16×16 regions having data, and the 8×8 subregions having data. Thus, for each subblock 260, the position of the subblock within the image array is defined by the subblock's order in the data structure 240 and the values of the data presence flags 252, 254.

Each subblock 260 has one or more vectors 264, each of which represents a waveform match in the 8×8 subregion associated with that subblock. Each waveform match vector 264 corresponds to one of the maximum match values found in the step 208 (FIG. 9) of the compression procedure.

Figure 11:
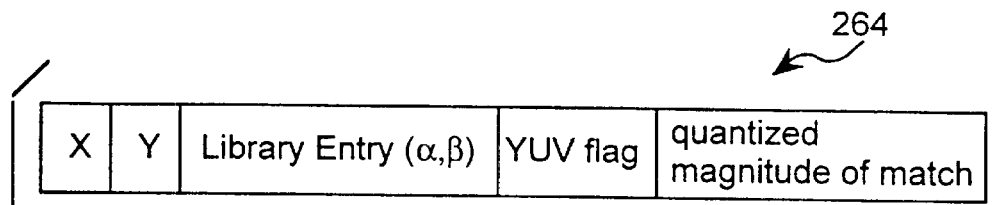

Next, the data structure of each waveform match vector 264 is described with respect to FIG. 11. The x, y position of the waveform match is encoded as follows. The value of x+8*y is encoded, followed by a one bit "last flag" to indicate if this the last vector for the 8×8 subregion. If an 8×8 subblock has more than one waveform match vector, the vectors are sorted in accordance with the value of x+8*y, with the vectors having the smallest value of x+8*y going first. The x, y position for the first waveform match vector is encoded using six bits to represent a value between 0 and 63.

For each vector after the first one in an 8×8 subblock, "uniform distribution Huffman" coding is used to encode the x, y position. If Z represents the x+8*y value for the previous vector, then it is known that the x+8*y value (P) for the current position must be between Z and 63, inclusive. Equivalently, the value P−Z must be between 0 and 63−Z. To encode P−Z, first the value q is determined where $q = \lfloor \log_2 (63-Z) \rfloor$ where the notation $\lfloor y \rfloor$ indicates the largest integer not exceeding y. Then, if $P-Z \in [0, 2^{q+1}-(64-Z)-1]$, encode P−Z using q bits;

elseif $P-Z \in [2^{q+1}-(64-Z), 63-Z]$, encode P−Z using q+1 bits.

This is known as uniform distribution Huffman coding. On average, uniform distribution Huffman coding reduces the number of bits used to encode a set of values to very be close to the sum of the logarithm, base 2, of the values being encoded.

The library index α,β representing the library waveform for any particular vector 264 is encoded along with the YUV flag. The reason for this is that residue data contains much more Y data than U and V data, and this fact can be used to reduce the amount of space used to encode the YUV flags. Also, the library indices α and β are each between 0 and 13 in the preferred embodiment, and uniform distribution Huffman coding can also be used to reduce the number of bits required to encode those values.

In the preferred embodiment, the α library index is encoded along with the YUV flag as follows:
A) if the YUV value is Y, the value output representing α and the YUV flag is the uniform distribution Huffman coding value for α;
B) if the YUV value is U, the value output representing α and the YUV flag is "1110" followed by the uniform distribution Huffman coding value for α;
C) if the YUV value is V, the value output representing α and the YUV flag is "1111" followed by the uniform distribution Huffman coding value for α.

The value output representing the β library index is the distribution Huffman coding value for β.

Finally, the magnitude of the match value $|<f,\psi_{a,b}>|$ is quantized using the quantizer 136 (FIG. 2), and then encoded as follows. The minimum quantized magnitude P for the entire residue frame is herein called $P^* = \text{Min } |P_i|$, and the value of P* is output at the beginning of the compressed data representing the residue frame (see 242, FIG. 10). For each residue frame, a value #P* is determined such that $$2^{\#P^*} < P^* \leq 2^{\#P^*+1}.$$

The magnitude of the match $P_i$ is the largest match value found during an iteration of the best match identification steps of the data compression procedure, taking into account the normalization factor $C_g^*$ for each of the predefined adaptive spline wavelets. Thus the magnitude of the match $P_i$ has already been scaled by the normalization factor $C_g$ for the adaptive spline wavelet that best matched the data being encoded.

The magnitude of the match $P_i$ is encoded as differential value, which in turn is encoded as three values:

$P^- = (|Pi| - P^*)/2^{\#P^*}$                      1)

$(|Pi| - P^*) \mod 2^{\#P^*}$                      2)

$\text{sign}(P_i)$                      3)

The second (modulo) value occupies #P* bits, which is known for the entire residue frame, and the third (sign) value occupies one bit. The first value (P⁻) is encoded in two pieces. First a value $q_i^-$ is determined such that $$2^{q_i} < P_i \leq 2^{q_i+1} \qquad (12)$$

$q_i^-$ is encoded using "count 1" encoding. For example, a value of 4 is represented as four 1's followed by a zero: 11110. Next, the value $P^- - 2^{q_i}$ is output using $q_i^-$ bits.

The waveform matches for each 32×32 region are encoded, processing the 32×32 regions in raster scan order (or any other predefined order). Within each 8×8 subregion having at least one waveform match, a vector is generator representing each such match using an efficient encoding scheme such as the one described above.

Data Decompression

Figure 1:
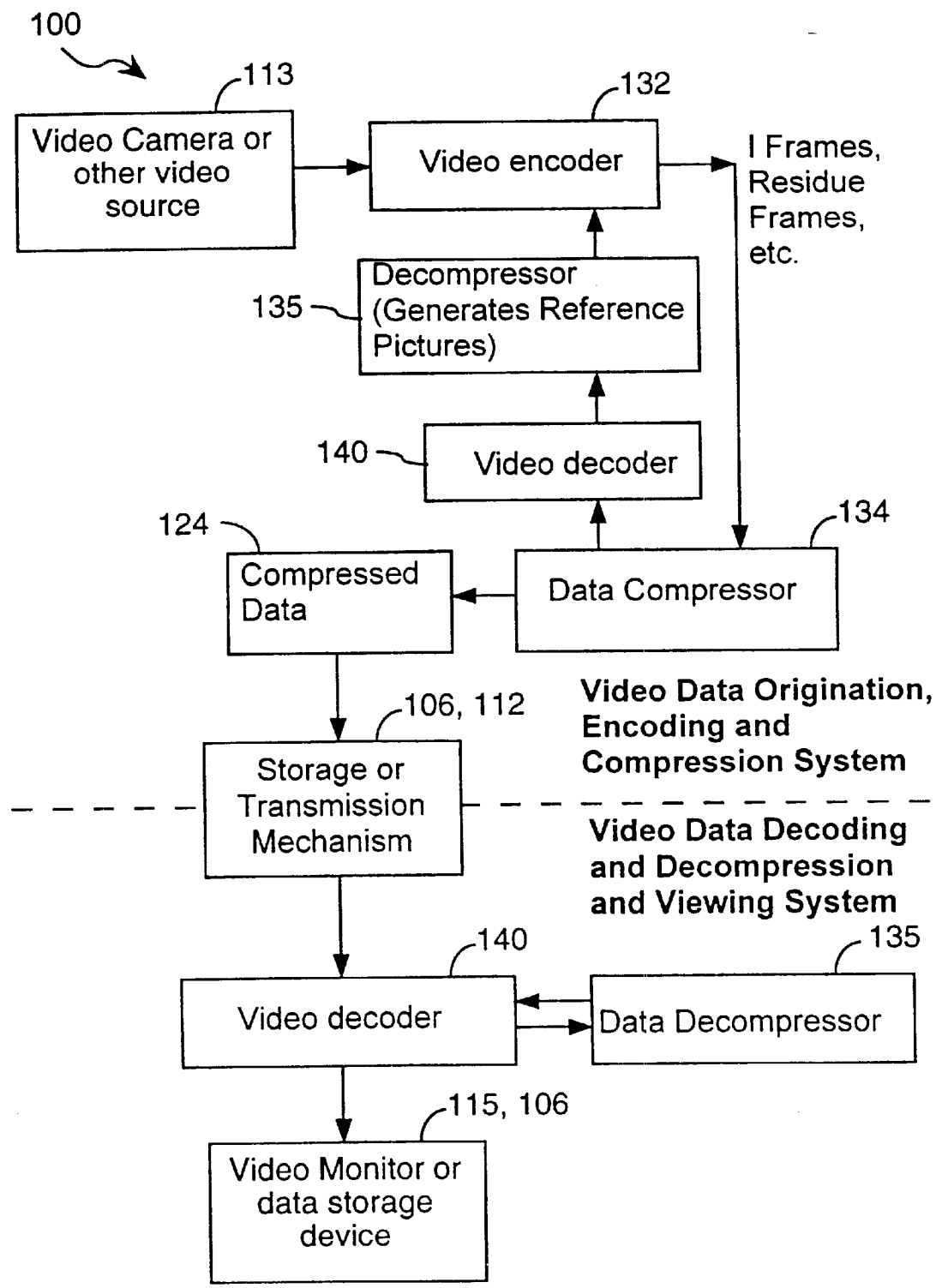
FIG. 1 is a block diagram of video data processing system.

Referring to FIGS. 1 and 2, the function of the data decompressor 135 is to regenerate a residue frame f⁻ from a set of compressed residue data. To do this, the received data compressed data, stored in the data structure shown in FIG. 10, is converted into a sequence of uncompressed vectors of the general form shown in FIG. 11, but with each vector providing the full x, y position of the waveform match within the residue frame. The library indices α and β are also decoded and separated from the YUV flag, and the quantized magnitude value is dequantized using the dequantization procedure 142 (FIG. 2).

Next, the decompressed vectors are used to generate a residue frame f⁻ as follows:

$$f^- = \Sigma \langle f, \psi_{j,a} \rangle^- \psi_{j,a} \tag{13}$$

where each of the $\langle f, \psi \rangle^-$ values in equation 13 represents the dequantized magnitude value in one of the uncompressed vectors, j represents the pair of library indices the identify the adaptive spline wavelet identified by that vector, and a represents the x, y position at which the adaptive spline wavelet is to be added to the residue frame f⁻ being reconstructed. Equation 13 may be applied separately for each of the Y, U and V planes of the residue frame.

Alternate Embodiments

The present invention can be implemented as a computer program product that includes a computer program mechanism embedded in a computer readable storage medium. For instance, the computer program product could contain the program modules shown in FIG. 2. These program modules may be stored on a CDROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of encoding a two dimensional array of data, comprising the steps of:
   accessing a library having entries corresponding to a set of predefined two dimensional adaptive spline wavelet waveforms, each predefined two dimensional adaptive spline wavelet waveforms being formed by the superposition of one or more B-splines;
   identifying a set of best matches between the array of data and the predefined two dimensional adaptive spline wavelet waveforms by generating the inner product of the array of data and each of the predefined two dimensional adaptive spline wavelet waveforms, each inner product being generated by FIR filtering the data with a corresponding set of FIR filter coefficients, and then determining which of the inner products have largest values; and
   generating data representing the identified set of best matches, the generated data indicating for each match: one of the library entries, a position within the array of data at which the match was found, and a magnitude of the match.

2. The method of claim 1, wherein the inner product between the array of data and some of the predefined two dimensional adaptive spline wavelet waveforms are generated by FIR filtering another one of the inner products using FIR filter coefficients specified by the library.

3. The method of claim 1, wherein the inner product between the array of data and a first one of the predefined two dimensional adaptive spline wavelet waveforms having a low resolution level is generated by FIR filtering the inner product of the array of data and a second one of the predefined two dimensional adaptive spline wavelet waveforms having a higher resolution level, using a predefined set of resolution modifying FIR filter coefficients.

4. The method of claim 1, including:
   generating the array of data by encoding a sequence of video frames into a primary data frame and a plurality of residual data frames, the array of data comprising one of the residual frames.

5. A computer program product for use in conjunction with a computer controlled system, the computer program product comprising a computer readable storage medium and a computer program mechanism embedded therein, the computer program mechanism comprising:
   a library having entries corresponding to a set of predefined two dimensional adaptive spline wavelet waveforms, each predefined two dimensional adaptive spline wavelet waveforms being formed by the superposition of one or more B-splines;
   instructions for identifying a set of best matches between the array of data and the predefined two dimensional adaptive spline wavelet waveforms, represented by the entries in the library, including instructions for generating the inner product of the array of data and each of the predefined two dimensional adaptive spline wavelet waveforms, each inner product being generated by FIR filtering the data with a corresponding set of FIR filter coefficients, and then determining which of the inner products have largest values; and
   instructions for generating data representing the identified set of best matches, the generated data indicating for each match: one of the library entries, a position within the array of data at which the match was found, and a magnitude of the match.

6. The computer program product of claim 5, wherein the inner product between the array of data and some of the predefined two dimensional adaptive spline wavelet waveforms are generated by FIR filtering another one of the inner products using FIR filter coefficients specified by the library.

7. The computer program product of claim 5, wherein the inner product between the array of data and a first one of the predefined two dimensional adaptive spline wavelet waveforms having a low resolution level is generated by FIR filtering the inner product of the array of data and a second one of the predefined two dimensional adaptive spline wavelet waveforms having a higher resolution level, using predefined set of resolution modifying FIR filter coefficients.

8. The computer program product of claim 5, including instructions for generating the array of data by encoding a sequence of video frames into a primary data frame and a plurality of residual data frames, the array of data comprising one of the residual data frames.

9. Image data processing apparatus, comprising:
   memory storing a library having entries corresponding to a set of predefined two dimensional adaptive spline wavelet waveforms, each predefined two dimensional adaptive spline wavelet waveforms being formed by the superposition of one or more B-splines:
   a processing unit for executing instructions in procedures;
   one or more image processing modules, stored in the memory and containing instructions executable by the processing unit, the one or more processing modules including:
      instructions for identifying a set of best matches between the array of data and the predefined two dimensional adaptive spline wavelet waveforms, represented by the entries in the library, including instructions for generating the inner product of the array of data and each of the predefined two dimensional adaptive spline wavelet waveforms, each inner product being generated by FIR filtering the data with a corresponding set of FIR filter coefficients, and then determining which of the inner products have largest values; and instructions for generating data representing the identified set of best matches, the generated data indicating for each match: one of the library entries, a position within the array of data at which the match was found, and a magnitude of the match.

10. The image data processing apparatus of claim 9, wherein the instructions for generating the inner product of the array of data and some of the predefined two dimensional adaptive spline wavelet waveforms include instructions for FIR filtering another one of the inner products using FIR filter coefficients specified by the library.

11. The image data processing apparatus of claim 9, wherein the instructions for generating the inner product between the array of data and a first one of the predefined two dimensional adaptive spline wavelet waveforms having a low resolution level includes instructions for FIR filtering the inner product of the array of data and a second one of the predefined two dimensional adaptive spline wavelet waveforms having a higher resolution level, using a predefined set of resolution modifying FIR filter coefficients.

12. The image data processing apparatus of claim 9, including instructions for generating the array of data by encoding a sequence of video frames into a primary data frame and plurality of residual data frames, the array of data comprising one of the residual data frames.

* * * * *

UNITED STATES PATENT AND TRADEMARK OFFICE
CERTIFICATE OF CORRECTION

PATENT NO.      : 6,587,507 B1
DATED           : July 1, 2003
INVENTOR(S)     : Chui et al.

It is certified that error appears in the above-identified patent and that said Letters Patent is hereby corrected as shown below:

<u>Column 16,</u>
Line 44, after "using", insert -- a --; and

<u>Column 18,</u>
Line 14, after "and", insert -- a --.

Signed and Sealed this

Twenty-sixth Day of August, 2003

JAMES E. ROGAN
*Director of the United States Patent and Trademark Office*